United States Patent [19]
Lewis

[11] 3,780,527
[45] Dec. 25, 1973

[54] CONTROL APPARATUS FOR A GAS TURBINE ENGINE

[75] Inventor: Geoffrey Arthur Lewis, Olton, Solihull, Warwickshire, England

[73] Assignee: Joseph Lucas (Industries) Limited, Birmingham, England

[22] Filed: Apr. 21, 1971

[21] Appl. No.: 136,150

[52] U.S. Cl....... 60/39.16 R, 60/39.25, 60/39.28 R, 91/167, 137/487.5
[51] Int. Cl............................ F02c 3/10, F02c 9/04
[58] Field of Search................... 60/39.16, 39.25, 60/39.17, 39.28 T; 91/167, 168, 459; 137/487.5

[56] References Cited
UNITED STATES PATENTS

| | | | |
|---|---|---|---|
| 3,606,754 | 9/1971 | White | 60/39.16 E X |
| 2,484,603 | 10/1949 | Audermar et al | 91/167 |
| 3,199,293 | 8/1965 | Starkey | 60/39.16 R |
| 2,638,993 | 5/1953 | Woodward | 416/30 |
| 2,372,393 | 3/1945 | Ray | 91/459 |
| 3,372,544 | 3/1968 | Kirkwood | 91/459 |

Primary Examiner—Carlton R. Croyle
Assistant Examiner—Robert E. Garrett
Attorney—Holman & Stern

[57] ABSTRACT

A control apparatus for a gas turbine having a separate gas generator and power turbine and nozzles for controlling the passage of gas to the power turbine, includes valves responsive to electrical signals to derive servo pressures to actuate the nozzles, the said electrical signals being generated in response to engine operating conditions and also providing an input to an electric actuator which can modify the nozzle position.

21 Claims, 2 Drawing Figures

INVENTOR
Geoffrey Arthur Lewis
Holman / Stern
ATTORNEYS

CONTROL APPARATUS FOR A GAS TURBINE ENGINE

This invention relates to control apparatus for a gas turbine engine and has as an object to provide a control apparatus in a convenient form.

According to the invention a control apparatus for a gas turbine engine which includes a gas generator, a power turbine and nozzles for controlling the passage of gas from the generator to the power turbine comprises means responsive to servo pressure signals and operable to move the nozzles, means for generating a fluid pressure, valve means operable by electrical signals to derive the said servo pressure signals from the said fluid pressure, means responsive to further electrical signals to modify the position of the nozzles and means for generating the said electrical signals in response to engine operating conditions.

A control apparatus according to the invention will now be described by way of example and with reference to the accompanying drawing in which.

Figure 1:
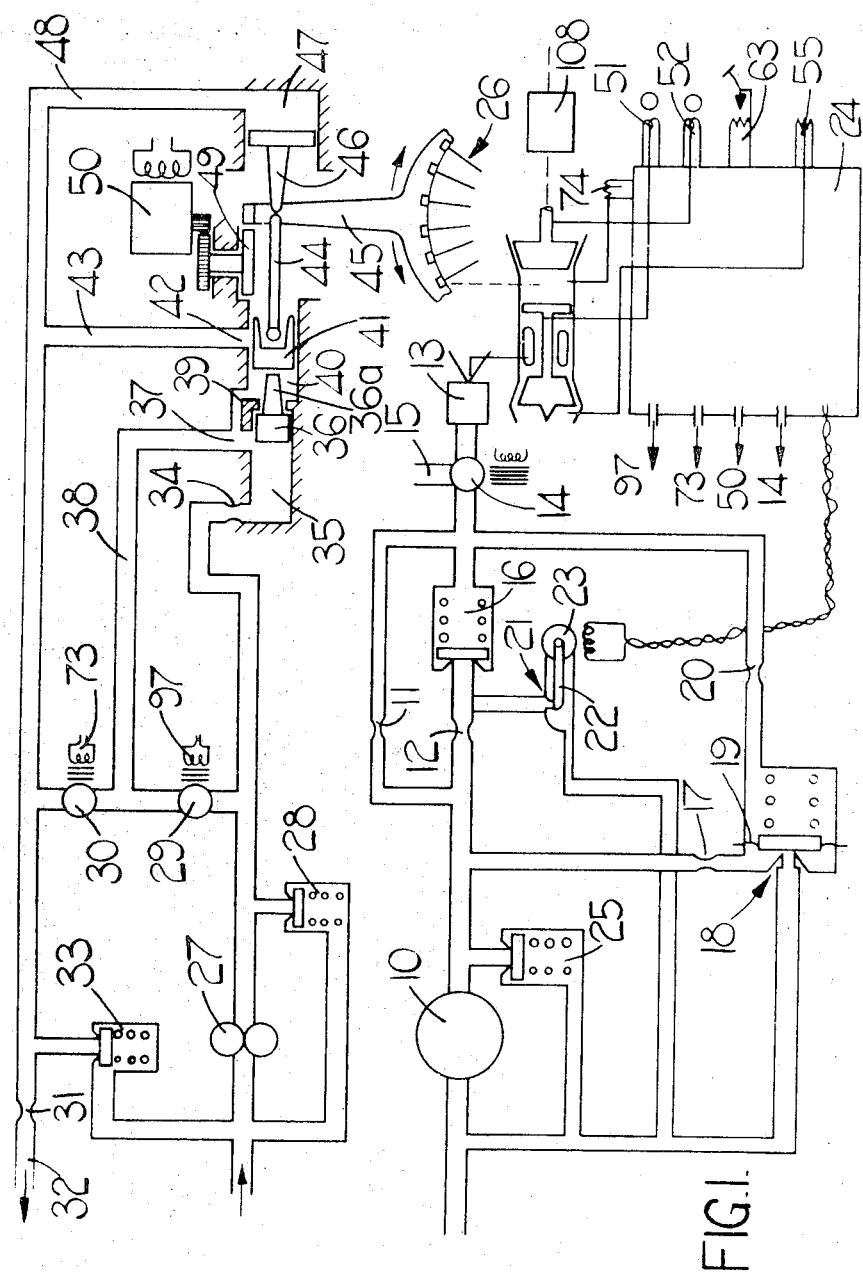
FIG. 1 shows diagrammatically a control apparatus for a gas turbine engine.
Figure 2:
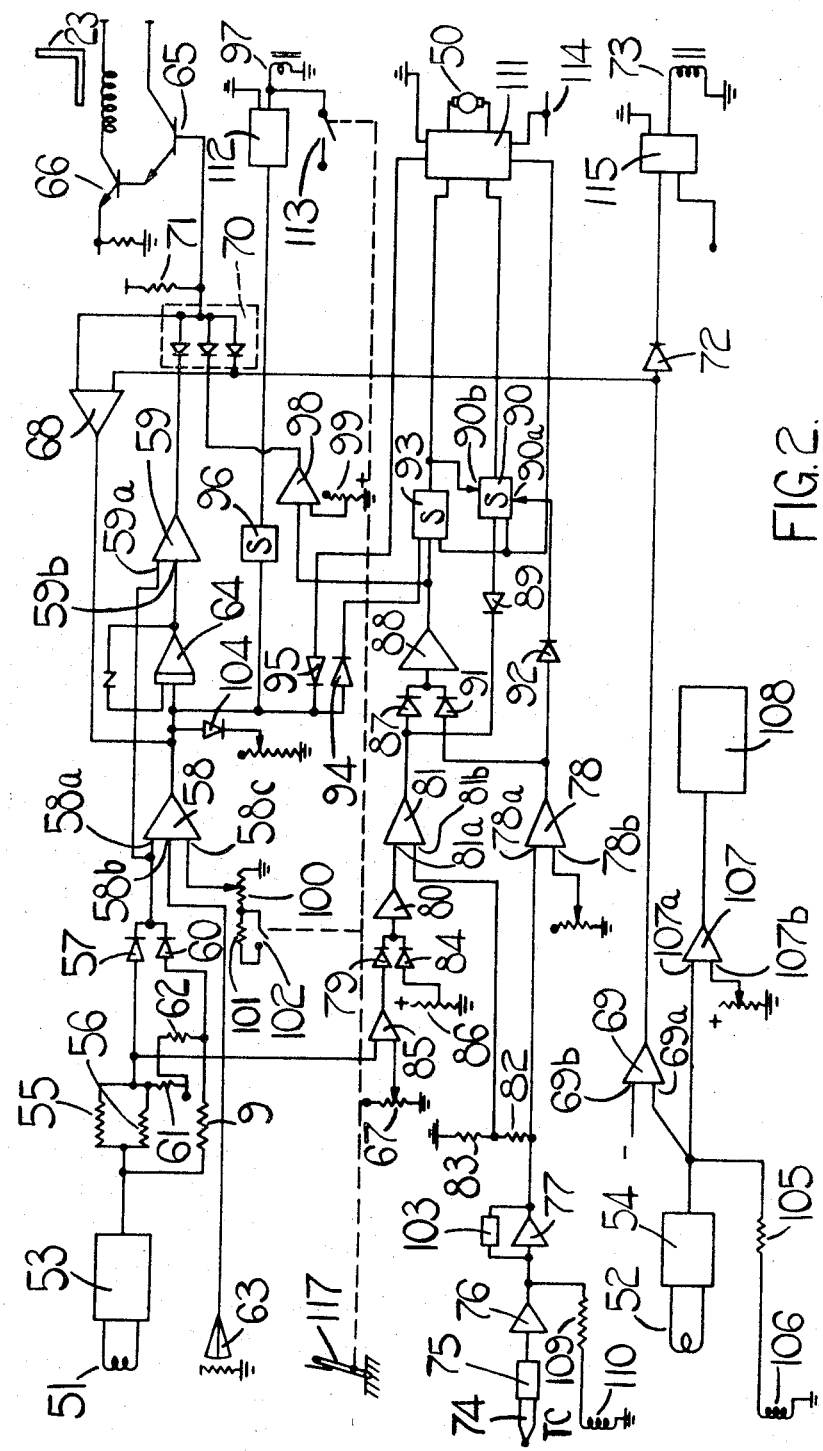
FIG. 2 is a block diagram of an associated electrical control circuit.

FIG. 1 shows a control apparatus for a gas turbine engine for a road vehicle. The engine comprises a gas generator portion having a compressor, a combustion chamber and a turbine, and a power turbine portion by means of which the vehicle is driven. A plurality of adjustable nozzle vanes 26 control the flow of gas from the gas generator portion to the power turbine portion. Nozzle vanes 26 are movable between selected positions in which they permit gas flows to the power turbine which correspond to steady state, maximum acceleration and reverse thrust.

A positive displacement pump 10 driven by the engine has its outlet connected to a pair of flow restrictors 11, 12 arranged in parallel. Flow restrictor 11 is connected to the engine fuel sprayers 13 via a shut off cock 14 having a dump connection 15. Restrictor 12 is connected to the cock 14 and sprayers 13 via a spring loaded pressurising valve 16.

A restrictor 17 and a spill valve 18 are connected in series across the pump 10. Spill valve 18 has a closure member mounted on a spring loaded diaphragm 19, the diaphragm 19 being responsive to a pressure drop across the network formed by restrictors 11, 12 and valve 16, the effect of this pressure drop on the diaphragm 19 being modified by pressure drop through restrictor 17 when valve 18 is open. Between the diaphragm 19 and the downstream side of the restrictor 11 and valve 16 is a further flow restrictor 20.

A second spill valve 21 is connected across the pump 10 and restrictor 12 and comprises a plate-type closure member 22 operable by a torque motor 23. Motor 23 applies a closing torque to member 22 is accordance with the magnitude of an electric current supplied by an electric control circuit 24, to be described later. Also connected across the pump 10 is a relief valve 25.

The nozzle vanes 26, for controlling gas flow to the power turbine are adjustable by a servo mechanism operated by fluid pressure derived from a lubricating oil system for the power plant. A positive displacement pump 27, across which is connected a spring loaded relief valve 28 is connected via a pair of solenoid operated valves 29, 30 and a flow restrictor 31 to an outlet 32. Valves 29, 30 are operable by the control circuit 24 in response to engine operating conditions in a manner later to be described. A second spring loaded relief valve 33 is connected between the upstream side of restrictor 31 and the inlet of the pump 27. The operating pressure of valve 28 is substantially greater than that of valve 33, typical values being respectively 200 and 40 pounds per square inch.

Pump 27 is also connected via a restrictor 34 to a cylinder 35 in which a piston element 36 is slidable. A port 37 in the wall of the cylinder 35 communicates via a passage 38 with valves 29, 30. Piston element 36 also forms a closure member for this port. Passage 38 also communicates via a passage 39 with a cylinder 40 axially aligned with cylinder 35, and having a larger diameter than cylinder 35. A piston 41 is slidable within cylinder 40 and is engageable with an abutment 36a extending from piston element 36. A port 42 in the wall of cylinder 40 communicates via a passage 43 with the restrictor 31.

A connecting rod 44 is engaged with both the piston 41 and with an actuator arm 45 by means of which the positions of the nozzles 26 are adjustable. Also engaging the arm 45 is a piston 46 having a substantially larger diameter than piston 41 and slidable in a cylinder 47 which communicates via a passage 48 with the restrictor 31. Engageable with the arm 45 is an edge cam 49 rotatable by a motor 50 energised by the control circuit 24. When both valves 29, 30 are open, pistons 41, 46 are subjected to substantially equal pressures. The greater area of piston 46 causes arm 45 to be biased into engagement with cam 49. In these conditions nozzle vanes 26 are thus under control of motor 50.

Control circuit 24 includes a pair of probes 51, 52 adapted to provide respective trains of square pulses whose frequencies are proportional to the speeds of the gas generator turbine and the power turbine. A pair of rectifier circuits 53, 54 have d.c., output signals respectively proportional to the said turbine speeds. The output of circuit 53 is connected via a pair of parallel resistors 55, 56 and a diode 57 to one input 58a of an error amplifier 58. The output of circuit 53 as also connected via a resistor 9 and a diode 60 to the same input 58a of amplifier 58. Input 58a is also connected to one input 59a of a further error amplifier 59. Resistor 55 is responsive to temperature at the intake of the gas generator compressor. The anodes of diodes 57, 60 are respectively connected via resistors 61, 62 to a reference voltage supply.

The signal at the anode of diode 57 is proportional to compressor speed modified by intake temperature $T_1$. The signal at the anode of diode 60 is proportional to compressor speed only. The diodes 57, 60 form a circuit in which the higher of these two signals passes to the error amplifier 58. In the curcuit described the arrangement is such that at intake temperatures less than 60° F the temperature modified signal passes to amplifier 58 and that above 60° F the unmodified speed signal passes to the amplifier 58.

An amplifier 63 produces a signal proportional to the setting of a power demand lever for the engine. The output signal from amplifier 63 is supplied to a second input 58b of the amplifier 58.

An input 58c of amplifier 58 is connected to the wiper of a potentiometer comprising resistors 100, 101 in series across a potential difference. A signal at input 58c effectively sets a lower limiting value of power demand. A switch 102 is connected in parallel with resistor 101 and is operated to by pass resistor 101 when a brake lever 117 is operated to provide a very low idling speed of the engine. The output signal from amplifier 58 is dependent on the difference between the power demanded of the engine and the power supplied thereby. The signal from amplifier 58 is positive when the demanded speed is greater than compressor speed, and is fed via an integrator 64 to a second input 59b of amplifier 59. There is an output from amplifier 59 only when the signal at input 59b is greater than that at input 59a. With a positive output signal from amplifier 58 the output signal from integrator 64 continues to increase, thereby increasing the value of the output signal from amplifier 59. Output of amplifier 58 is connected via a diode 104 to a reference voltage level, whereby the magnitude of a positive output from amplifier 58, and hence acceleration of the engine, is limited.

The output signal from amplifier 59 provides, via diode network 70, a negative signal which can oppose the forward bias applied via a resistor 71 to a transistor 65, and thus controls the current signal applied to the torque motor 23 (also shown in FIG. 1), an increasing current acting to shut the associated spill valve 21 and thereby increase fuel flow to the engine. If the compressor speed signal increases at a greater rate than the output of integrator 64, the output signal from amplifier 59 falls, causing a reduction in fuel flow to the engine.

When the output from amplifier 58 is zero, the output from integrator 64 will remain at a constant value, supplying a constant positive signal to amplifier 59.

Circuit 54 has a positive output signal which is, as explained, proportional to power turbine speed, and is applied to one input 69a of an error amplifier 69. The other input 69b of amplifier 69 has applied thereto a negative reference signal. The amplifier 69 is such that, when the signal at input 69a is below a predetermined level the amplifier output is a large positive signal. As the speed of the power turbine increases and the signal at input 69a rises above the predetermined level, the output of amplifier 69 falls, eventually becoming increasingly negative. The signal output of amplifier 69 is applied to the diode network 70, and when this output is lower (less positive) than the output signal from amplifier 59, offsets the bias applied via resistor 71 to transistor 65. When the signal output of amplifier 69 is negative the spill valve 21 is fully open. A negative signal output from amplifier 69 is also applied, via a diode 72 to energise solenoid 73 via a relay 115 to shut valve 30 (FIG. 1) thereby causing, in a manner later to be described, nozzles 26 to supply a gas flow which tends to reverse the direction of rotation of the power turbine. The output signal from amplifier 69 is also applied, via an amplifier 68, to the output of amplifier 58.

The output of circuit 54 is also applied, via a resistor 105, to a meter 106 to provide an indication of power turbine speed. The output of circuit 54 is further applied to an input 107a of an error amplifier 107 whose other input 107b is provided by a reference signal the value of which is proportional to a predetermined fraction of the top speed of the power turbine. There is an output signal from amplifier 107 only when this fraction is exceeded, and this signal is used to operate an interlock on a gearbox 108 associated with the power turbine output shaft, so that at speeds above the said fraction of gear ratio cannot be shifted down.

A number of thermocouples, shown generally at 74, are used to sense the combustion temperature Tc immediately downstream of the gas generator. The thermocouple output signal passes, via a cold junction correction circuit 75, a high common-mode rejection circuit 76 and an amplifier 77 to one input 78a of a comparator 78. A lag correction circuit 103 is connected across amplifier 77 and provides a feedback signal proportional to the rate of change of temperature Tc. The output signal from amplifier 77 is thus a step function during changes in Tc. The output signal from circuit 76 is a supplied via a resistor 109 to a meter 110 which provides an indication of combustion temperature. The other input 78b has applied thereto a reference signal proportional to an upper temperature limit. The comparator 78 has an output signal only when the combustion temperature Tc exceeds the upper limit.

The temperature modified speed signal at the anode of diode 57 is applied to one input of a difference amplifier 85. The other input of amplifier 85 is supplied with a reference voltage derived from a resistor 67. An output signal from amplifier 85 thus increases with increasing value of the temperature modified speed signal and is applied via diode 79 to amplifier 80. A reference voltage is derived from a resistor 86 and is also applied to amplifier 80 via a diode 84. Diodes 79, 84 are arranged so that the higher of the signals respectively applied thereto is passed to the input of amplifier 80. The output signal of amplifier 80 is thus a reference signal which is substantially constant up to a point at which the output signal from amplifier 85, derived from the temperature modified speed signal, exceeds the voltage derived from resistor 86. Thereafter this reference signal increases in response to an increase in the temperature modified speed signal.

The reference signal from amplifier 80 is applied to one input 81a of a difference amplifier 81. The other input 81b of amplifier 81 has applied thereto a signal derived from the output of amplifier 77 via a potentiometer formed by a pair of resistors 82, 83 resistor 82 being responsive to the ambient temperature. The output signal of amplifier 81 is thus dependent on the difference between a signal proportional to the ratio of the combustion and ambient temperatures and the reference signal input to amplifier 81.

When the output signal of amplifier 81 is positive it can pass via a diode 87 to the input of an amplifier 88. When the output signal of amplifier 81 is negative it can pass via a diode 89 to a switching circuit 90. The output of difference amplifier 78 is connected via a diode 91 to the input of amplifier 88, and via a diode 92 to a control connection 90a of switching circuit 90. The output signal of amplifier 88 forms an input signal to a switching circuit 93.

Switching circuits 90, 93 have their outputs connected to a control circuit 111 for the motor 50, Control circuit 111 includes a pair of thyristors responsive to output signals from switching circuits 90, 93 respectively to control current from a source 114 to rotate motor 50 in a forward or reverse direction. Circuit 111 also includes means for supplying to circuits 90, 93 a feedback signal derived from the speed of motor 50. This feedback signal is conveniently derived from the back e.m.f. of motor 50.

A positive output signal from amplifier 81 indicates an unacceptably high combustion temperature, and this positive output signal is passed via amplifier 88 and switching circuit 93 to operate motor 50 is a direction to cause the nozzles 36 to permit an increased flow of gas to the power turbine. A negative output signal from amplifier 81, indicating an unacceptably low combustion temperature, passes via diode 89 and switching circuit 90 to operate motor 50 in a direction to reduce gas flow to the power turbine. Switching circuit 90 has an additional control input 90b supplied from the output of circuit 93, whereby an output signal from circuit 93 acts to modify an output signal from switching circuit 90, An output signal from amplifier 78, indicating that combustion temperature exceeds a desired upper limit, operates to reduce an output signal from switching circuit 90. Output signal from amplifier 78 is also applied, via diode 91 to operate motor 50 to increase gas flow to the power turbine, the arrangement of diodes 87, 91 being such that the lower of the signals respectively applied thereto passes to amplifier 88.

Circuit 93 has yet another input connection to which is applied, via a diode 94, an output signal from amplifier 58. The output of amplifier 58 is also applied, via a diode 95, to the control connection of the thyristor in circuit 111 which controls the rotation of motor 50 in a direction which results in increased gas flow. A switching circuit 96 is operable, when the magnitude of a positive or negative output signal from amplifier 58 exceeds a predetermined level, to energise a solenoid 97, via a relay 112, to open valve 29 (FIG. 1). Solenoid 97 is also operable by a switch 113 which is operated in unison with switch 102. Valve 29 is, therefore, also opened during low idling speeds of the engine.

A positive output signal from amplifier 58 acts, via diode 94 and switching circuit 93 to operate motor 50 in a direction increase gas flow to the power turbine. A negative output signal acts, via diode 95, to modify any signal tending to increase gas flow. As previously described, in steady state conditions there is no output signal from amplifier 58. An output signal from amplifier 58 may thus be used to control the nozzle 26, in advance of any temperature change.

The presence of an output signal from amplifier 88 indicates, as previously described, that combustion temperature is unacceptably high. This output signal is supplied to one input of a difference amplifier 98. The other input of amplifier 98 is supplied with a reference signal voltage derived from a resistor 99. There is thus an output signal from amplifier 98 when the value of the output signal from amplifier 88 rises above that of the reference voltage. Motor 50 will already have operated, as previously described, to inrease gas flow to the power turbine. An output signal from amplifier 98 due to a continuing combustion temperature rise, is applied to the diode network 70, causing motor 23 to shut valve 21. The arrangement of network 70 is such that the lowest signal applied thereto acts to offset the bias of transistor 65.

In use, control of output power from the engine is principally effected by controlling fuel flow to govern the speed of the gas generator compressor. Fuel delivered by pump 10 flows, via restrictor 11 and cock 14 to the sprayers 13. Restrictor 11 defines a minimum fuel flow to the sprayers 13 when valve 16 is shut. Provided that fuel pressure downstream of restrictor 12 is sufficiently high to open valve 16, fuel also flows to sprayers 13 via restrictor 12. Restrictor 12 thus defines a maximum fuel flow condition.

An increase in the pressure drop across restrictors 11, 12 and valve 16 acts to urge diaphragm 19 against its biasing spring to open valve 18. As valve 18 opens the increased flow therethrough results in an increased pressure drop through restrictor 17. Increasing speed of the pump 10 results in an increase in the pressure drop through restrictor 17. Less fuel is therefore spilled by valve 18 for a given pressure downstream of valve 16. Valve 18 thus operates to give an increasing fuel flow to the engine with increasing engine speed. The rate of change of fuel flow with respect to engine speed may be varied by altering the restriction of restrictor 17.

Spill valve 21 operates, in response to the aforesaid electrical control signal to spill fuel from the downstream side of restrictor 12. The electrical control signal is generated, as above described, by the control circuit 24 in response to the operating conditions of the engine.

Should diaphragm 19 fail, restrictor 20 minimises the consequent fuel flow between valve 18 and the downstream side of the valve 16.

The position of nozzle vanes 26 is adjusted by motor 50 in response to signals from circuit 24 as above described. These adjustments are responsive to combustion and air intake temperatures to maintain the former at the highest acceptable level. Nozzle vanes 26 are also movable by servo pressure signals controlled by valve 29, 30. Pump 27 delivers lubricating oil for the engine, the oil normally flowing through valve 29, 30 and restrictor 31. Oil pressure on the upstream side of valve 29 is applied, via restrictor 30 to one side of piston element 36. The oil pressure upstream of restrictor 31 is applied, via passage 48 to piston 41.

Valves 29, 30 are normally open and the pressure applied to the said one side of piston element 36 is also applied, via passage 38, 39 to the other side thereof and to piston 41. The difference in area between pistons 41, 46 acts to urge the arm 45 to the left, as seen in the drawing, whereby nozzle vanes 26 are moved so as to permit a steady state gas flow to the power turbine. In this position of arm 45 the piston element 36 shuts off port 37, and vanes 26 are positioned by motor 50.

If valve 29 is shut by solenoid 97 the pressure in cylinder 35 rises, urging piston element 36 to the right, and, by engagement with piston 41, moving arm 45 to the right against piston 46. As piston element 36 uncovers port 37, oil flows via restrictor 34 and passage 38, to by-pass the valve 29. The arm 45 and nozzles 26 thus adopt an equilibrium position in which the pressure drop through port 37 and valve 30 cause the forces exerted by pistons 41, 46 to balance. This position of the nozzles 26 corresponds to a maximum gas flow to drive the power turbine in a forward direction, i.e., the position for engine acceleration.

If valve 30 is shut, in response to energisation of solenoid 73, the pressure in cylinder 40 rises Arm 45 thus moves to the right to a position in which oil flows via restrictor 34 passage 39, port 42 and passage 43 to the engine. In this position gas flow is such as to urge the power turbine to reverse its direction of rotation. Shutting of valve 29 or valve 30 in response to signals from circuit 24 thus causes the servo pressure control for nozzle vanes 26 to over-ride the control by motor 50.

When both valves 29, 30 are open and the nozzles 26 are in the steady state forward running condition, the arm 45 engages the cam 49, whereby the position of the nozzles 26 may be trimmed in accordance with signals applied to motor 50 by the circuit 24 as previously described.

I claim:

1. A control apparatus for a gas turbine engine which includes a gas generator, a power turbine and nozzles for controlling the passage of gas from the generator to the power turbine comprising an actuator element for said nozzles, means responsive to servo-pressure signals and engageable with said actuator element to move the nozzles, means for generating a fluid pressure, valve means operable by electrical signals to derive said servo-pressure signals from said fluid pressure, mechanical stop means engageable by said actuating element to limit movement of said nozzles in one direction by said servo-pressure responsive means, means responsive to further electrical signals for adjusting said mechanical stop means and means for generating both of said electrical signals in response to engine operating conditions.

2. A control apparatus as claimed in claim 1 in which said valve means comprises first and second valves in series.

3. A control apparatus as claimed in claim 2 in which the means responsive to said servo-pressure signals includes a first piston element responsive to the pressure upstream of said first valve and coacting with said actuator element to move the latter away from said stop means.

4. A control apparatus as claimed in claim 3 which includes a further valve operable to provide a fluid flow by passing said first valve when said first piston element has moved a predetermined distance in response to said pressure upstream of said first valve.

5. A control apparatus as claimed in claim 4 in which said first piston element provides a closure member for said further valve.

6. a control apparatus as claimed in claim 4 in which the means responsive to said servo-pressure includes a second piston element axially aligned with and engageable by said first piston element and responsive to the pressure between said first and second valves so as to be movable thereby in the same direction as the first piston element is movable by the pressure upstream of said first valve.

7. A control apparatus as claimed in claim 6 which includes an additional valve operable to provide a flow bypassing said second valve when said second piston element has moved a predetermined distance in response to said pressure between the first and second valves.

8. A control apparatus as claimed in claim 7 in which said second piston element provides a closure member for said additional valve.

9. A control apparatus as claimed in claim 3 which includes means for biasing said nozzles against said servo pressure responsive means.

10. A control apparatus as claimed in claim 9 in which said biasing means comprises a third piston element responsive to the pressure downstream of said second valve.

11. A control apparatus as claimed in claim 10 in which the effective diameter of said third piston element is larger than that of either the first or second piston elements.

12. A control apparatus as claimed in claim 1 in which said mechanical stop means comprises an electric motor and a cam driven by the motor, said can being engageable by said actuator element.

13. A control apparatus as claimed in claim 2 in which the means for generating said electrical signal comprises means for generating a first electrical signal to operate one of said valves and means for generating a second electrical signal to operate another of said valves.

14. A control apparatus as claimed in claim 13 in which the means for generating said first electrical signal comprises means for providing a first control signal dependent on the speed of a compressor shaft of the engine, a power demand control for the engine, means for providing a second control signal dependent upon the setting of said power demand control and means responsive to the difference between said first and second control signals to generate said first electrical signal.

15. A control apparatus as claimed in claim 14 in which the means for providing said first control signal comprises means for generating a signal proportional to engine compressor speed, means for modifying said speed-proportional signal in accordance with the temperature at the engine compressor intake and a first discriminator circuit responsive to said speed-proportional signal and to said modified signal to generate said first control signal, whereby said first control signal is dependent either on said speed signal or on said modified signal, whichever is the higher.

16. A control apparatus as claimed in claim 13 in which the means for generating a second electrical signal to operate another of said valve means includes means for providing a third control signal dependent on the speed of said power turbine and means for providing said second electrical signal when said third control signal exceeds a predetermined value.

17. A control apparatus as claimed in claim 13 in which the means for generating said further electrical signals includes means for providing a fourth control signal dependent on the amount by which the combustion temperature of the engine exceeds a predetermined value of switching means operable by said fourth control signal to cause said nozzles to admit an increased gas flow to the power turbine.

18. A control apparatus as claimed in claim 17 in which the means for providing the fourth control signal comprises means for providing a fifth control signal dependent on the amount by which said combustion temperature exceeds a predetermined level, means for providing a sixth control signal dependent on the amount by which the ratio of said combustion temperature to the temperature at the engine compressor intake exceeds a predetermined level, and a second discriminating circuit whereby said fourth control signal is dependent upon whichever of said fifth and sixth control signals is the larger.

19. A control apparatus as claimed in claim 18 in which the means for generating said further electrical signals includes switching means responsive to said fifth and sixth control signals to cause said nozzles to reduce gas flow to the power turbine.

20. A control apparatus as claimed in Claim 17 in which said switching means is also responsive to said fourth control signal when said second control signal is larger than said first control signal, and which controls means for routing said output signal from said difference responsive means to operate the switching means.

21. A control apparatus as claimed in claim 17 which includes further means for routeing said output signal from said difference responsive means to modify said further electrical control signals when the first control signal is larger than the second control signal.

* * * * *